United States Patent
Nageshkar et al.

(10) Patent No.: US 11,472,326 B1
(45) Date of Patent: Oct. 18, 2022

(54) VEHICLE DOOR ASSEMBLY HAVING A RAMP

(71) Applicant: Ford Global Technologies, LLC, Dearborn, MI (US)

(72) Inventors: Vishal Vinayak Nageshkar, Farmington Hills, MI (US); Sangram Tamhankar, Canton, MI (US); Victoria Leigh Schein, Dearborn, MI (US); Patrick Maloney, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 17/240,343

(22) Filed: Apr. 26, 2021

(51) Int. Cl.
  *B60P 1/43* (2006.01)
  *B60J 5/04* (2006.01)
  *B60J 5/06* (2006.01)

(52) U.S. Cl.
  CPC ............ *B60P 1/435* (2013.01); *B60J 5/0468* (2013.01); *B60J 5/06* (2013.01)

(58) Field of Classification Search
  CPC .... B60J 5/06; B60J 5/0468; B60J 5/00; B60P 1/435; B60P 1/44; B60P 1/43; A61G 3/061
  USPC .................................. 296/50, 151; 414/537
  See application file for complete search history.

(56) References Cited

U.S. PATENT DOCUMENTS

| | | | |
|---|---|---|---|
| 2,843,277 A * | 7/1958 | Brannan | B60P 1/4414 414/556 |
| 4,076,301 A * | 2/1978 | Gergoe | B60J 5/103 292/216 |
| 6,241,452 B1 * | 6/2001 | Eekhoff | B60P 1/43 14/71.1 |
| 7,677,626 B2 | 3/2010 | Hanzel | |
| 10,214,250 B2 * | 2/2019 | Hemphill | B60Q 1/307 |
| 2001/0004155 A1 * | 6/2001 | Decker | B60J 5/12 296/57.1 |
| 2021/0161737 A1 * | 6/2021 | Kim | A61G 3/061 |

FOREIGN PATENT DOCUMENTS

| | | |
|---|---|---|
| CN | 212447057 | 2/2021 |
| DE | 102018128560 | 5/2020 |
| DE | 102019204766 | 10/2020 |
| DE | 102019210672 | 1/2021 |

* cited by examiner

*Primary Examiner* — D Glenn Dayoan
*Assistant Examiner* — Sunsurraye Westbrook
(74) *Attorney, Agent, or Firm* — Vichit Chea; Carlson, Gaskey & Olds, P.C.

(57) ABSTRACT

A vehicle door assembly includes, among other things, a ramp pivotable back-and-forth between a stowed position and a deployed position. The vehicle door assembly further includes a door slidable back-and-forth between a closed position and an open position. The door and the ramp are configured to slide together when the ramp is in the stowed position. The door is configured to slide relative to the ramp when the ramp is in the deployed position.

19 Claims, 5 Drawing Sheets

VEHICLE DOOR ASSEMBLY HAVING A RAMP

TECHNICAL FIELD

This disclosure relates generally to a vehicle door assembly having a slidable door and a ramp.

BACKGROUND

Some vehicles, such as vans, include a slidable door. In a closed position, the slidable door is disposed within a door opening. Sliding the slidable door from the closed position to an open position moves the slidable door out of the door opening so that a user can enter or exit the vehicle.

SUMMARY

A vehicle door assembly according to an exemplary aspect of the present disclosure includes, among other things, a ramp pivotable back-and-forth between a stowed position and a deployed position. The vehicle door assembly further includes a door slidable back-and-forth between a closed position and an open position. The door and the ramp are configured to slide together when the ramp is in the stowed position. The door is configured to slide relative to the ramp when the ramp is in the deployed position.

In another exemplary embodiment of the foregoing assembly, the ramp includes a first side and an opposite, second side. The first side faces laterally outward from a longitudinal axis of the vehicle when the ramp is in the stowed position. The first side faces vertically downward when the ramp is in the deployed position.

In another example of any of the foregoing assemblies, the first side provides an exterior surface of the vehicle. The exterior surface is visible and exposed when the ramp is in the stowed position.

In another example of any of the foregoing assemblies, the second side provides a ramped surface when the ramp is in the deployed position. The ramped surface faces vertically upward when the ramp is in the deployed position.

In another example of any of the foregoing vehicle assemblies, the door in the closed position is disposed within a door opening of the vehicle. The door in the open position is disposed outboard of the door opening and is displaced relative to the door opening along a longitudinal axis of the vehicle.

In another example of any of the foregoing assemblies, the ramp is configured to pivot about a horizontally extending axis.

Another example of any of the foregoing assemblies includes a sill assembly having a track. The door includes a rail structure that slides within the track as the door slides back-and-forth between the closed position and the open position.

In another exemplary embodiment of any of the foregoing assemblies, the vehicle sill is configured to move back-and-forth between an extended position and a retracted position relative to a longitudinal axis of a vehicle. The vehicle sill is in the extended position when the door slides between the closed position and the open position.

Another exemplary embodiment of any of the foregoing assemblies includes a sill actuator that moves the vehicle sill back-and-forth between the extended position and the retracted position.

In another exemplary embodiment of any of the foregoing assemblies, the vehicle sill assembly is at a lower side of a door opening. The door in the closed position is disposed within the door opening.

Another exemplary embodiment of any of the foregoing assemblies includes an actuator that pivots the ramp back-and-forth between the stowed position and the deployed position.

Another exemplary embodiment of any of the foregoing assemblies includes a first locking assembly that transitions between a locked position and an unlocked position. The ramp in the stowed position is coupled to the door through the first locking assembly when the first locking assembly is in the locked position.

Another exemplary embodiment of any of the foregoing assemblies includes a second locking assembly that transitions between a locked position and an unlocked position. The ramp is coupled to a vehicle sill through the second locking assembly when the second locking assembly is in the locked position.

In another exemplary embodiment of any of the foregoing vehicle assemblies, the first locking assembly is in the locked position and the second locking assembly is in the unlocked position when the door and the ramp are sliding together between the closed position and the open position. The first locking assembly is in the unlocked position and the second locking assembly is in the locked position when the door is sliding relative to the ramp between the closed position and the open position.

In another exemplary embodiment of any of the foregoing vehicle assemblies, the ramp is configured to directly contact a ground surface when the ramp is in the deployed position.

A door actuation method according to another exemplary aspect of the present disclosure includes, among other things, sliding a ramp together with a door between a closed position and an open position. The door is disposed within a door opening of a vehicle when the door is in the closed position. The door is disposed outboard of the door opening and is displaced relative to the door opening along a longitudinal axis of the vehicle when the door is in the open position. The method further includes unlocking the ramp from the door and, after the unlocking, pivoting the ramp from a stowed position to a deployed position. The door is slidable relative to the ramp between the closed position and the open position after the unlocking.

In another exemplary embodiment of the foregoing method, the unlocking of the ramp from the door is when the door is in the closed position.

In another exemplary embodiment of any of the foregoing methods, the door is slideably coupled to a vehicle sill using a rail and track system.

In another exemplary embodiment of any of the foregoing methods, the ramp in the deployed position is configured to directly contact a ground surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
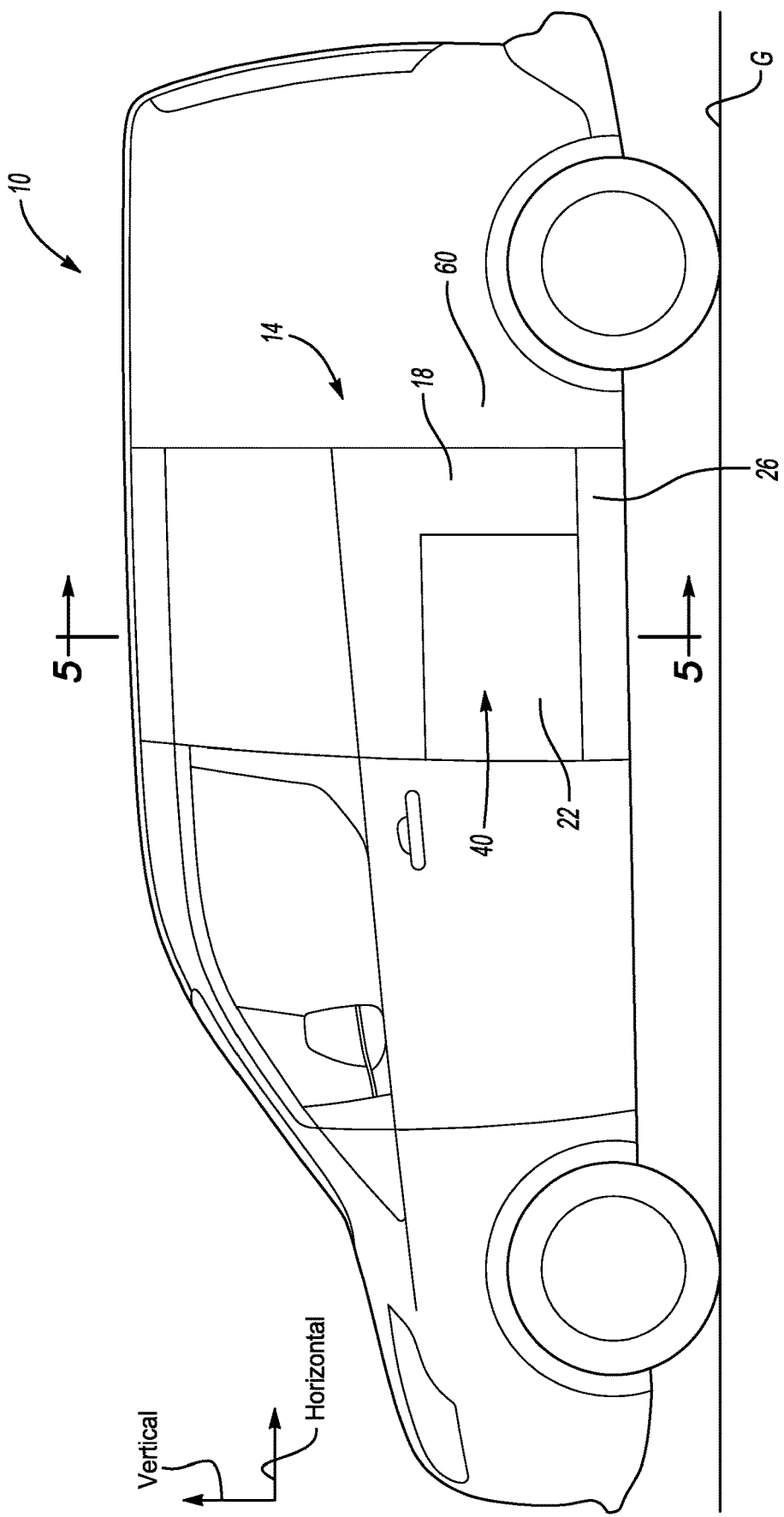
FIG. 1 shows a side view of a vehicle having a vehicle door assembly with a door of the vehicle door assembly is in a closed position.
Figure 2:
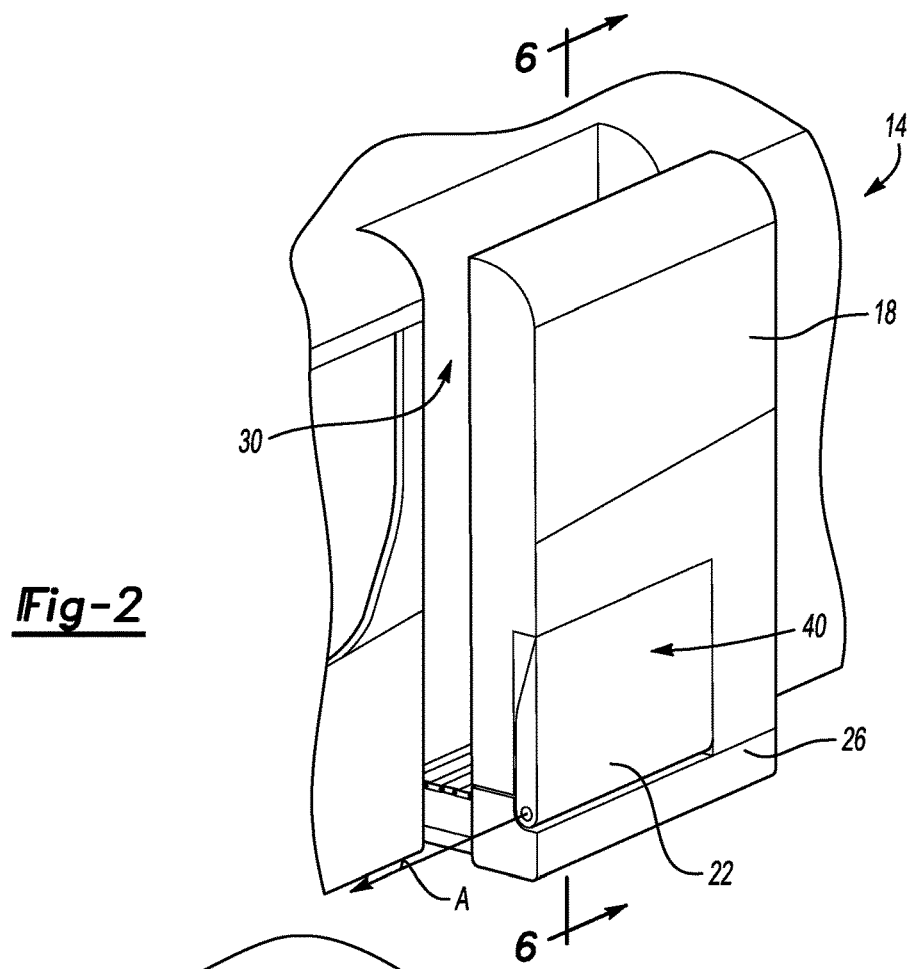
FIG. 2 shows the door of FIG. 1 moved from the closed position of FIG. 1.

This disclosure details an exemplary door assembly for a vehicle. A ramp is incorporated into the door assembly. The ramp can be used, for example, by a wheelchair user when entering the vehicle.

With reference to FIGS. 1-4, a vehicle 10 includes a vehicle door assembly 14. In the exemplary embodiment, the vehicle door assembly 14 has a door 18, a ramp 22, and a door sill 26. A longitudinal axis of the vehicle 10 passes through the vehicle 10 from a front end to a rear end of the vehicle 10.

Figure 4:
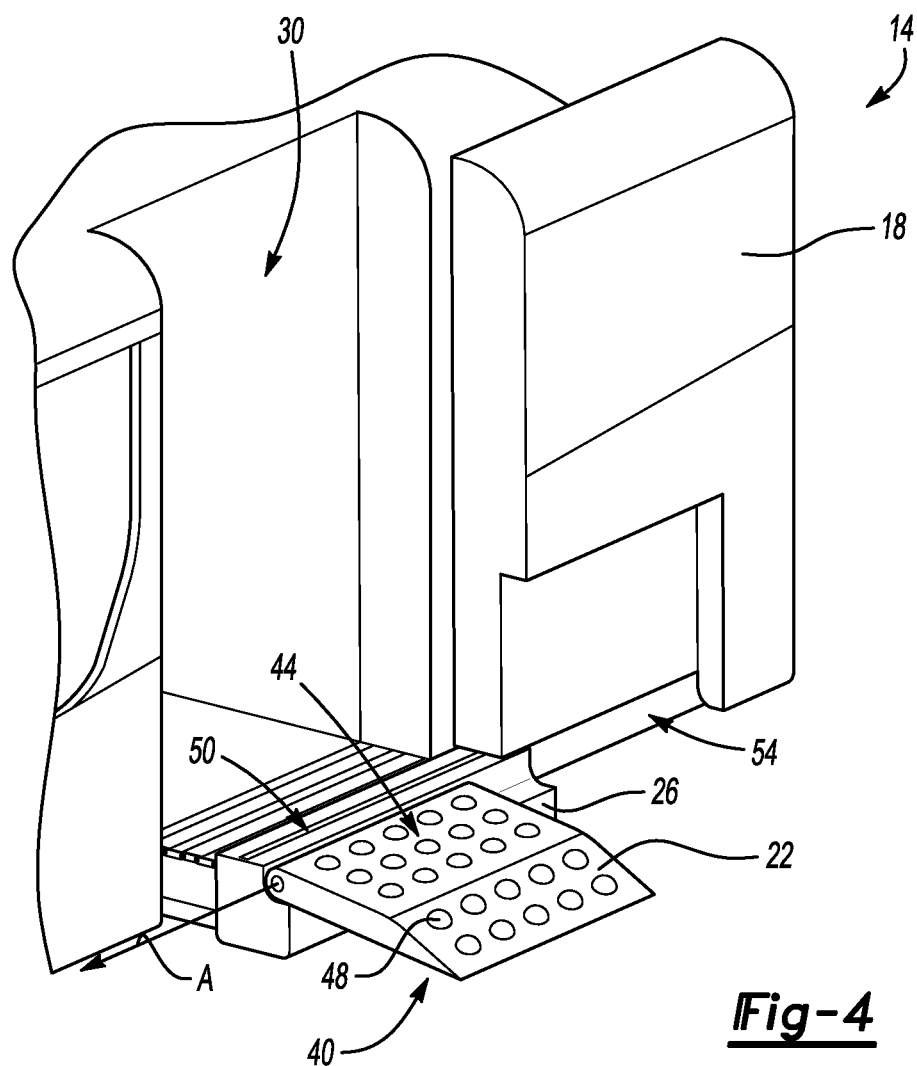
FIG. 4 shows the door of the vehicle door assembly of FIG. 1 in a fully open position while the ramp is in the deployed position.

The door 18 of the vehicle door assembly 14 is slidable back-and-forth between a closed position, as shown in FIG. 1, and a fully open position as shown in FIG. 4. The ramp 22 can pivot back-and-forth between the stowed position of FIG. 2 and the deployed position of FIG. 4.

When the ramp 22 is in the stowed position, the door 18 and the ramp 22 can move and slide together as the door 18 moves back-and-forth between the closed position and the open position. When the ramp 22 is in the deployed position, the door 18 can slide relative to the ramp 22. That is, the door 18 can slide from the position of FIG. 3 to the position of FIG. 4 while the ramp 22 remains in the deployed position.

The door 18 in the closed position is disposed within a door opening 30. When the door 18 is in the open position of FIG. 4, the door 18 is disposed outboard of the door opening 30 and is displaced relative to the door opening 30 along a longitudinally extending longitudinal axis of the vehicle 10.

When the door 18 is in the open position of FIG. 4 and the ramp 22 is in the deployed position as shown in FIG. 4, a user can traverse the ramp 22 when entering or exiting the vehicle 10 through the door opening 30. For example, a wheelchair user could utilize the ramp 22 to assist in loading the wheelchair into the vehicle 10. The user could also utilize the ramp 22 to help the user load cargo, such as packages, into the vehicle 10.

The ramp 22 includes a first side 40 and an opposite second side 44. The first side 40 faces laterally outward away from a longitudinal axis of the vehicle 10 when the ramp 22 is in the stowed position. When the ramp 22 is in the stowed position shown in FIGS. 1 and 2, the first side 40 provides an exterior or A-surface of the vehicle 10. That is, when the ramp 22 is in the stowed position of FIGS. 1 and 2, the first side 40 of the ramp 22 is visible and exposed to an observer outside the vehicle 10. The first side 40 can be painted or otherwise color matched to other exterior surfaces of the vehicle 10.

Figure 3:
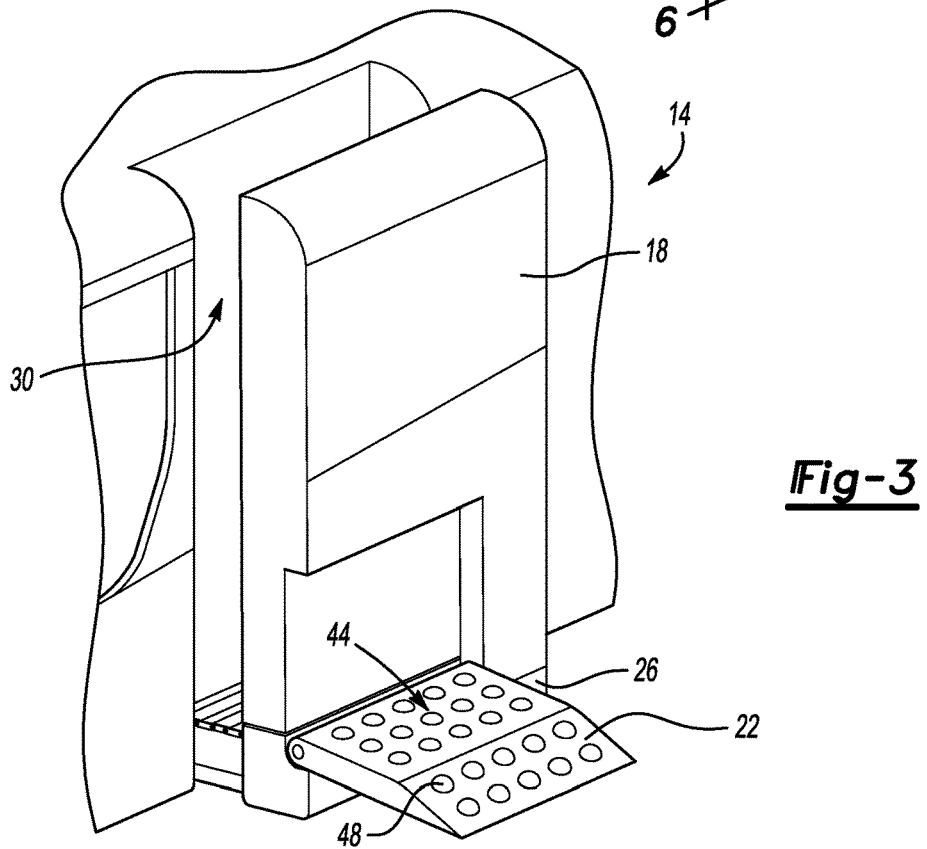
FIG. 3 shows a perspective view of a ramp of the vehicle door assembly moved to a deployed position when the door of the vehicle door assembly in the position of FIG. 2.

When the ramp 22 is in the deployed position of FIGS. 3 and 4, the first side 40 faces vertically downward and can directly contact a ground surface G. Vertical and horizontal, for purposes of this disclosure, are with reference to ground G and a general orientation of the vehicle 10 during operation.

The second side 44 faces vertically upward when the ramp 22 is in the deployed position. The second side 44 can include raised features 48 that provide traction to a user utilizing the ramp 22.

The ramp 22 is configured to pivot back-and-forth between the stowed position and the deployed position about an axis A, which is a horizontally extending axis in this example.

The ramp 22 is pivotably connected to the sill 26 when pivoting back-and-forth between the stowed position and the deployed position. This permits the ramp 22 to pivot while still allowing the door 18 to slide relative to the ramp 22.

The sill 26 is at a vertically lower side of the door opening 30. The sill 26 is configured to move back-and-forth between an extended position shown in FIGS. 2-4 and a retracted position relative to the vehicle longitudinal axis.

The sill 26 includes a track 50 in this example. The door 18 includes a rail structure 54 that slides within the track 50 as the door 18 slides back-and-forth between the closed position of FIG. 1 and the open position of FIG. 4. Moving the sill 26 to the extended position moves the track 50 outward so the door 18 can slide rearward without contacting a fixed wall 60 of the vehicle (FIG. 1).

Figure 5:
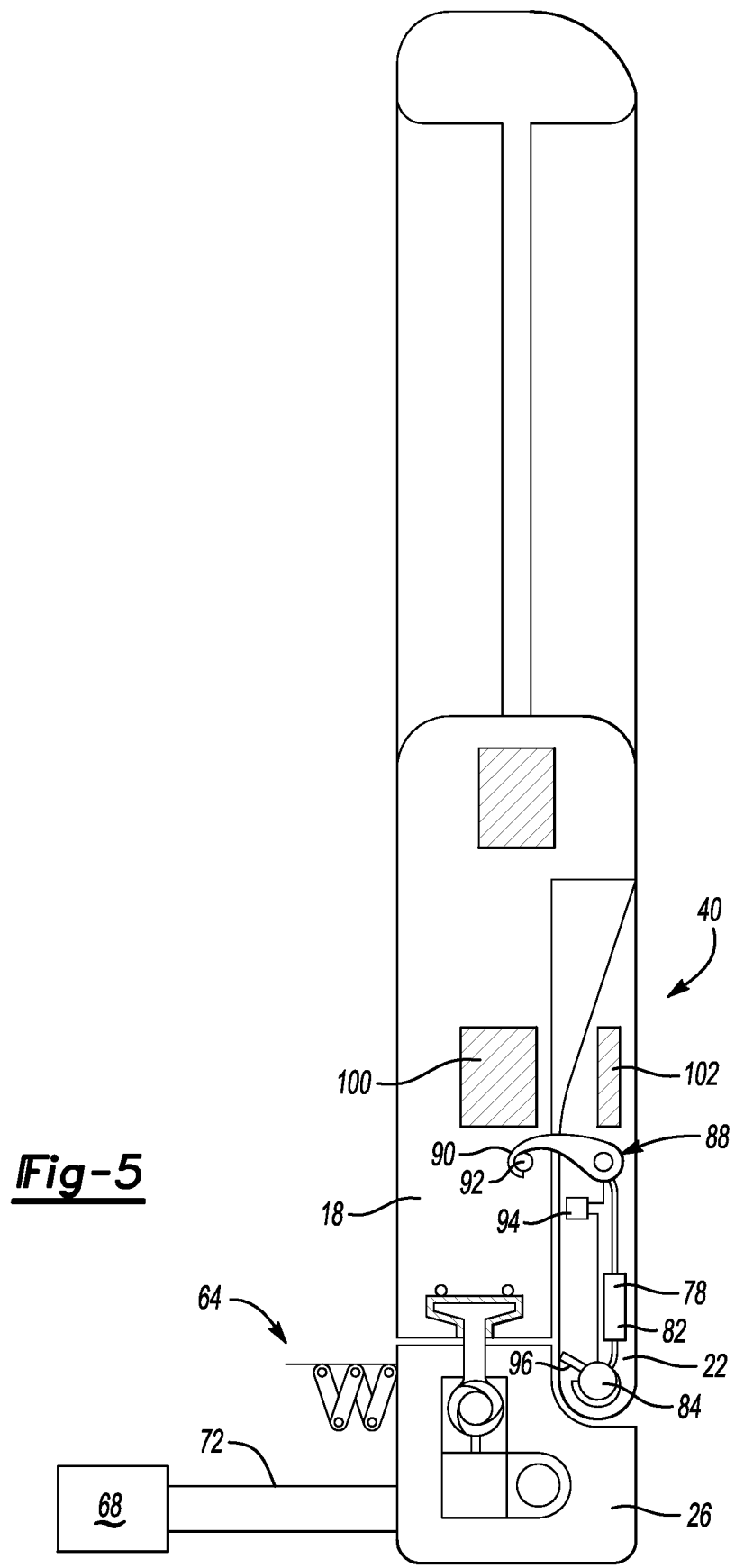
FIG. 5 shows a section view at line 5-5 in FIG. 1 with a sill of the vehicle in a retracted position.
Figure 6:
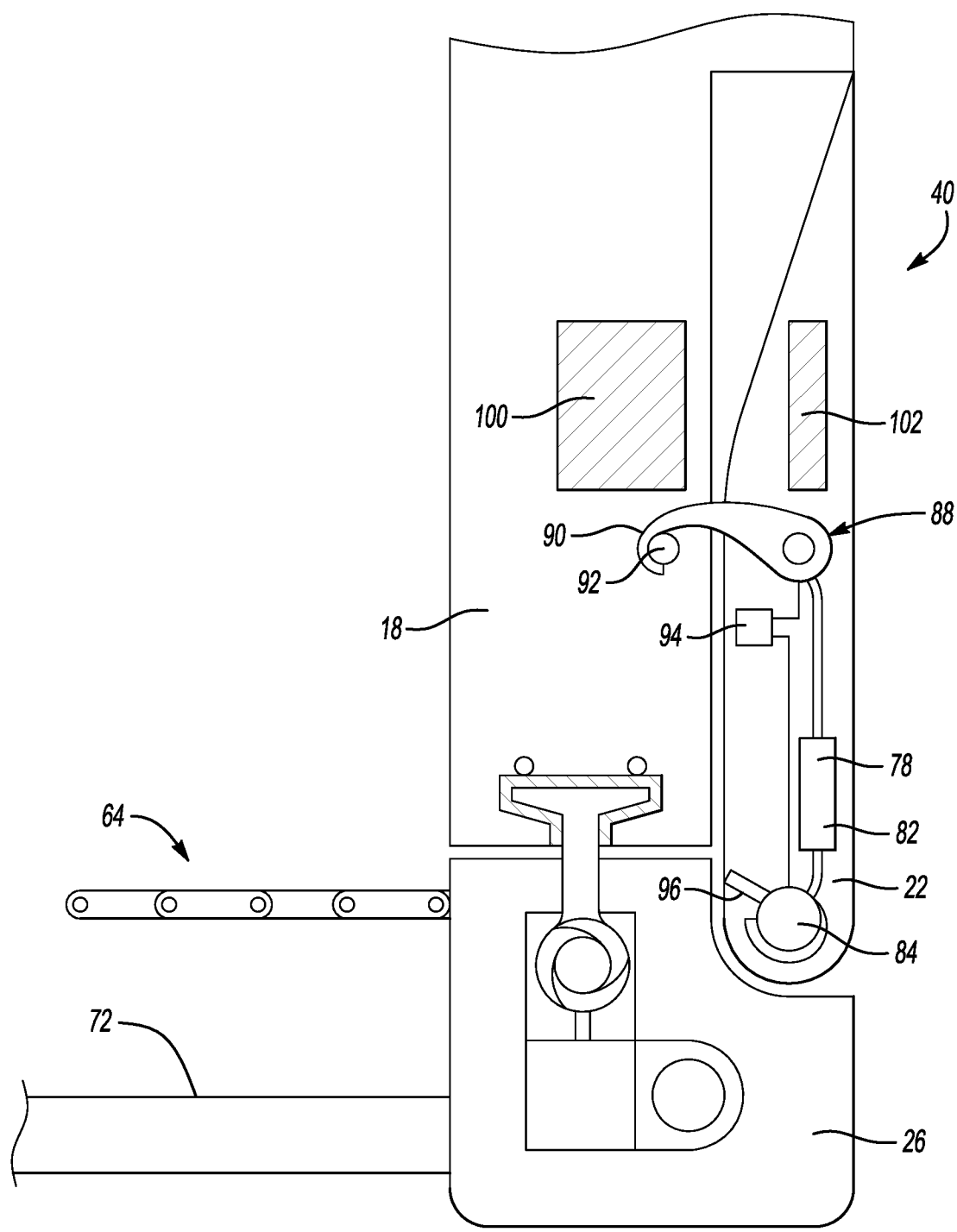
FIG. 6 show a close-up view of an area of the section in FIG. 5 when the sill is in the extended position.

With reference now to FIGS. 5 and 6 and continuing reference to FIG. 1, a floor 64 is used to cover the gap resulting from moving the sill 26 outward. As the sill 26 is transitioned to the extended position, the floor 64 extends to cover a gap between the sill 26 and an interior floor of the vehicle 10. The floor 64 is a folding or origami floor. An actuator 68 can drive a telescoping arm 72 to extend the sill outboard and to pull the floor 64 to the extended position shown in FIG. 6. The actuator 68 could be a hydraulic actuator, for example.

Another actuator 78 is used to move the ramp 22. The actuator 78 can include a motor 82 and a lead screw 84. The motor 82 can drive the lead screw 84 to pivot the ramp 22 back-and-forth between the stowed position and the deployed position.

The vehicle door assembly 14 additionally includes a first locking assembly 88 that can hold the ramp 22 in the stowed position. The first locking assembly 88 includes a hook 90 that engages a pin 92 when the first locking assembly 88 is in the locked position. Prior to driving the lead screw 84, an actuator assembly 94 can rotate the hook 90 to transition the first locking assembly 88 from the locked position, shown in FIG. 6, to an unlocked position. This permits the pivoting movement of the ramp 22 from the stowed position to the deployed position.

While transitioning the first locking assembly 88 from the locked position to the unlocked position, a second locking assembly 96 can transition from an unlocked position to a locked position. In the locked position, the second locking assembly 96 can pivotably couple the ramp 22 to the sill 26.

In this example, the first locking assembly 88 unlocks as the second locking assembly 96 locks. Similarly, the first locking assembly 88 locks as the second locking assembly unlocks. This logic ensures that the ramp 22 remains coupled to the door 18 or the sill 26.

In the exemplary embodiment, the ramp 22 is pivotably coupled to the sill 26 when the ramp 22 is pivoted between the stowed position and the deployed position. The first locking assembly 88 is in the locked position and the second locking assembly 96 is in an unlocked position when the door 18 and the ramp 22 are sliding together between the closed position and the open position. The first locking assembly 88 is in the unlocked position and the second locking assembly 96 is in the locked position when the door 18 is sliding relative to the ramp 22 between the closed position and the open position.

Thus, when utilizing the ramp 22 is not desired, the user can slide the ramp 22 together with the door 18 from the closed position to the open position. If the user instead wants to use the ramp 22 when entering or exiting the vehicle 10, the ramp 22 can be decoupled from the door 18 and then pivoted to the deployed position. The door 18 can then be moved to a fully open position to reveal the door opening 30.

As shown, structural support beams 100 and 102 can extend through the door 18 and the ramp 22, respectively.

Features of the disclosed examples include a vehicle door assembly that provides a ramp to a vehicle. The ramp can be used to, for example, load cargo, or to assist the user entering or exiting the vehicle. The ramp 22 can provide an A-surface of the vehicle 10 when the ramp 22 is not deployed and is in a stowed position.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle door assembly, comprising:
   a ramp pivotable back-and-forth between a stowed position and a deployed position; and
   a door slidable back-and-forth between a closed position and an open position, the door and the ramp configured to slide together when the ramp is in the stowed position, the door configured to slide relative to the ramp when the ramp is in the deployed position.

2. The vehicle assembly of claim 1, wherein the ramp includes a first side and an opposite, second side, the first side facing laterally outward from a longitudinal axis of a vehicle when the ramp is in the stowed position, the first side facing vertically downward when the ramp is in the deployed position.

3. The vehicle assembly of claim 2, wherein the first side provides an exterior surface of the vehicle, the exterior surface visible and exposed when the ramp is in the stowed position.

4. The vehicle assembly of claim 2, wherein the second side provides a ramped surface when the ramp is in the deployed position, the ramped surface facing vertically downward when the ramp is in the deployed position.

5. The vehicle assembly of claim 1, wherein the door in the closed position is disposed within a door opening of the vehicle, wherein the door in the open position is disposed outboard of the door opening and is displaced relative to the door opening along a longitudinal axis of the vehicle.

6. The vehicle assembly of claim 1, wherein the ramp is configured to pivot about a horizontally extending axis.

7. The vehicle assembly of claim 1, further comprising a vehicle sill assembly having a track, wherein the door includes a rail structure that slides within the track as the door slides back-and-forth between the closed position and the fully-open position.

8. The vehicle assembly of claim 7, wherein the vehicle sill is configured to move back-and-forth between an extended position and a retracted position relative to a longitudinal axis of a vehicle, the vehicle sill is in the extended position when the door slides between the closed position and the open position.

9. The vehicle assembly of claim 8, further comprising a sill actuator that moves the vehicle sill back-and-forth between the extended position and the retracted position.

10. The vehicle assembly of claim 7, wherein the vehicle sill assembly is at a lower side of a door opening, the door in the closed position disposed within the door opening.

11. The vehicle assembly of claim 1, further comprising an actuator that pivots the ramp back-and-forth between the stowed position and the deployed position.

12. The vehicle assembly of claim 1, further comprising a first locking assembly that transitions between a locked position and an unlocked position, the ramp in the stowed position coupled to the door through the first locking assembly when the first locking assembly is in the locked position.

13. The vehicle assembly of claim 12, further comprising a second locking assembly that transitions between a locked position and an unlocked position, the ramp coupled to a vehicle sill through the second locking assembly when the second locking assembly is in the locked position.

14. The vehicle assembly of claim 13,
   wherein the first locking assembly is in the locked position and the second locking assembly is in the unlocked position when the door and the ramp are sliding together between the closed position and the open position,
   wherein the first locking assembly is in the unlocked position and the second locking assembly is in the locked position when the door is sliding relative to the ramp between the closed position and the open position.

15. The vehicle assembly of claim 1, wherein the ramp is configured to directly contact a ground surface when the ramp is in the deployed position.

16. A door actuation method, comprising:
   sliding a ramp together with a door between a closed position and an open position, the door disposed within a door opening of a vehicle when the door is in the closed position, the door disposed outboard of the door opening and displaced relative to the door opening along a longitudinal axis of the vehicle when the door is in the open position; and
   unlocking the ramp from the door; and
   after the unlocking, pivoting the ramp from a stowed position to a deployed position, the door slidable relative to the ramp between the closed position and the open position after the unlocking.

17. The door actuation method of claim 16, wherein the unlocking of the ramp from the door is when the door is in the closed position.

18. The door actuation method of claim 16, wherein the door is slideably coupled to a vehicle sill using a rail and track system.

19. The door actuation method of claim 16, wherein the ramp in the deployed position is configured to directly contact a ground surface.

* * * * *